US012717282B2

(12) United States Patent
Horstman et al.

(10) Patent No.: US 12,717,282 B2
(45) Date of Patent: Aug. 25, 2026

(54) ATOMIC SENSOR WITH SELF-ALIGNED COMPONENTS

(71) Applicant: Honeywell International Inc., Charlotte, NC (US)

(72) Inventors: Luke Horstman, Saint Louis Park, MN (US); Caleb Sjoquist, Clearwater, FL (US); Chad Fertig, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 302 days.

(21) Appl. No.: 18/583,731

(22) Filed: Feb. 21, 2024

(65) Prior Publication Data

US 2025/0264689 A1 Aug. 21, 2025

(51) Int. Cl.
*G04F 5/14* (2006.01)

(52) U.S. Cl.
CPC .................................... *G04F 5/14* (2013.01)

(58) Field of Classification Search
CPC ........... G04F 5/14; G04F 5/145; G01C 19/62; H03L 7/26
USPC .................................................. 331/94, 94.1
See application file for complete search history.

(56) References Cited

U.S. PATENT DOCUMENTS 7,965,147 B2 6/2011 Strabley et al.
8,853,613 B1 10/2014 Compton et al.
9,011,333 B2 4/2015 Geissler et al.
9,083,363 B2 7/2015 Fertig et al.
9,989,926 B2 6/2018 Fertig et al.
10,218,368 B2 2/2019 Fertig et al.
11,733,321 B2 8/2023 Rosenfeld
2011/0031969 A1 2/2011 Kitching et al.
2015/0022816 A1* 1/2015 Schober ................ G01N 21/59 29/592.1
2022/0301738 A1 9/2022 Blatt et al.

FOREIGN PATENT DOCUMENTS

EP 3316050 A1 5/2018
WO 2020168314 A1 8/2020
WO 2023149159 A1 8/2023

OTHER PUBLICATIONS

European Patent Office, "Extended European Search Report", dated May 26, 2025, from U.S. Appl. No. 18/583,731, from Foreign Counterpart to U.S. Appl. No. 18/583,731, pp. 1 through 6, Published: EP.

* cited by examiner

*Primary Examiner* — Richard Tan
(74) *Attorney, Agent, or Firm* — Fogg & Powers LLC

(57) ABSTRACT

Techniques are provided self-aligning components of an atomic sensor including a first cover, a second cover, a structure-cell including a structure and a cell, containing a vapor of atoms, in the structure. Atomic sensor components are aligned in a cover in which they are form fitted into a recess or mounted on a surface of a pedestal. Each cover is aligned with the structure-cell or component(s) therein using guide holes in each of the cover and the structure-cell into each of which an alignment pin is inserted. Due to such alignments, each component is self-aligned with respect another component or to a region of the structure-cell, e.g., the cell or an atomic vapor in the cell.

20 Claims, 8 Drawing Sheets

100A

440

ATOMIC SENSOR WITH SELF-ALIGNED COMPONENTS

STATEMENT REGARDING FEDERALLY SPONSORED RESEARCH OR DEVELOPMENT

This invention was made with Government support under contract number N00014-22-C-1043, awarded by the Office of Naval Research. The Government has certain rights in the invention.

BACKGROUND

Atomic clocks, such as that described in U.S. Pat. No. 10,218,368 (the "'368 Patent"), are typically manufactured by hand to ensure accurate alignment of components. Optical and electrical components of an atomic clock need to be aligned after assembly of the atomic clock. For example, such alignment may be performed with adjustment screws. The '368 Patent is incorporated herein by reference. Such manufacturing methods are laborious, and thus costly.

SUMMARY

In some aspects, the techniques described herein relate to an apparatus for self-aligning components of an atomic sensor, the apparatus including: a center structure-cell (SC) including a first SC surface, a second SC surface opposite the first SC surface, a center structure, and a cell which is in the center structure and which contains a vapor of atoms; a first cover including a first cover surface contacting the first SC surface, a first recessed surface facing the first SC surface, and at least one of: one or more first pedestals and one or more first recesses, wherein each first pedestal projects from the first recessed surface and has a first pedestal surface facing the center structure-cell, and wherein each first recess is formed with the first recessed surface and faces the center structure-cell; at least one of: (a) a first set of atomic sensor components, wherein each atomic sensor component, of the first set of atomic sensor components, is affixed to the first pedestal surface of a unique first pedestal and is self-aligned with respect to at least one of a portion of the center structure-cell and an atomic sensor component of one of a third set of atomic sensor components and a fourth set of atomic sensor components; and (b) a second set of atomic sensor components, wherein each atomic sensor component, of the second set of atomic sensor components, is form fitted in a unique first recess and is self-aligned with respect to at least one of a portion of the center structure-cell and an atomic sensor component of one of the third set of atomic sensor components and the fourth set of atomic sensor components; at least one of: a first set of N guide holes each of which is in the center structure-cell and through the first SC surface and a second set of N guide holes each of which is through the first cover; N alignment pins each which is inserted into either: (a) a guide hole of the first set of n guide holes, (b) a guide hole of the second set of N guide holes, or (c) a pair of a guide hole of the first set of N guide holes and a guide hole of the second set of N guide holes, wherein Nis an integer greater than one; a second cover including a second cover surface configured to contact the second SC surface, a second recessed surface configured to face the second SC surface, and at least one of: one or more second pedestals and one or more second recesses, wherein each second pedestal projects from the second recessed surface and has a second pedestal surface facing the center structure-cell, and wherein each second recess is formed with the second recessed surface and faces the center structure-cell; at least one of: a third set of M guide holes in the center structure-cell and through the second SC surface and a fourth set of M guide holes each of which is through the second cover; M alignment pins each which is inserted into either: (a) a guide hole of the third set of M guide holes, (b) a guide hole of the fourth set of M guide holes, or (c) a pair of a guide hole of the third set of M guide holes and a guide hole of the fourth set of M guide holes, wherein M is an integer greater than one; at least one of: (a) a third set of atomic sensor components, wherein each atomic sensor component, of the third set of atomic sensor components, is affixed to a first pedestal surface of a unique first pedestal and is self-aligned with respect to at least one of a portion of the center structure-cell and an atomic sensor component of one of the first set of atomic sensor components and the second set of atomic sensor components; and (b) a fourth set of atomic sensor components, wherein each atomic sensor component, of the fourth set of atomic sensor components is form fitted in a unique second recess and is self-aligned with respect to at least one of a portion of the center structure-cell and an atomic sensor component of one of the first set of atomic sensor components and the second set of atomic sensor components.

In some aspects, the techniques described herein relate to a method for self-aligning components of an atomic sensor including a center structure-cell, a first cover, and a second cover, the method including: at least one of: (a) form fitting each atomic sensor component of a set of first atomic sensor components into a unique a recess in the first cover and (b) affixing each atomic sensor component of a set of second atomic sensor components to a pedestal surface of a unique pedestal projecting from the first cover; at least one of: (a) form fitting each atomic sensor component of a set of third atomic sensor components into a unique a recess in the second cover and/or (b) affixing each atomic sensor component of a set of fourth atomic sensor components to a pedestal surface of a unique pedestal projecting from the second cover; aligning each guide hole of a first set of guide holes in the first cover is aligned with a unique guide hole of a second set of guide holes in the center structure-cell, and inserting an alignment pin into each aligned pair of a guide hole of the first set of guide holes and a guide hole of the second set of guide holes; and aligning each guide hole of a third set of guide holes in the second cover with a unique guide hole of a fourth set of guide holes in the center structure-cell, and inserting an alignment pin into each aligned pair of a guide hole of the third set of guide holes and a guide hole of the fourth set of guide holes; wherein each of the first and the second atomic sensor components is self-aligned with respect to at least one of a portion of the center structure-cell and a third or a fourth atomic sensor component; wherein each of the third and the fourth atomic sensor components is self-aligned with respect to at least one of a portion of the center structure-cell and a first or a second atomic sensor component.

In some aspects, the techniques described herein relate to an atomic sensor, including: a center structure-cell (SC) including a center structure, a cell which is in the center structure and which contains a vapor of atoms, and a first set of guide holes, a first SC surface and a second SC surface opposite the first SC surface; a first cover including (a) a second set of guide holes and (b) at least one of: a first set of recesses in a first surface of the first cover and a first set of pedestals projecting from the first surface of the first cover, wherein each recess of the first set of recesses is form fitted with either a wire coil, a mirror, or a photosensor, and wherein either a wire coil, a mirror, or a photosensor is mounted on each pedestal of the first set of pedestals; and a second cover including (a) a third set of guide holes and (b) at least one of: a second set of recesses in a second surface of the second cover and a second set of pedestals projecting from the second surface of the first cover, wherein each recess of the second set of recesses is form fitted with either a photonic grating, wire coil, a mirror, or a photosensor, and wherein either a photonic grating, a wire coil, a mirror, or a photosensor is mounted on each pedestal of the second set of pedestals; wherein the first cover is mechanically attached to the center structure-cell; wherein the first surface is adjacent to the first SC surface; wherein the second cover is mechanically attached to the center structure-cell; wherein the second surface is adjacent to the second SC surface; wherein each guide hole of the first set of guide holes configured to be aligned, with a guide hole of at least one of the second set of guide holes and the third set of guide holes, forming a set of aligned guide holes; wherein component on a pedestal or in a recess of the first or the second cover is self-aligned with at least one of a portion of the center structure-cell and a component on a pedestal or in a recess of respectively the second or first cover.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
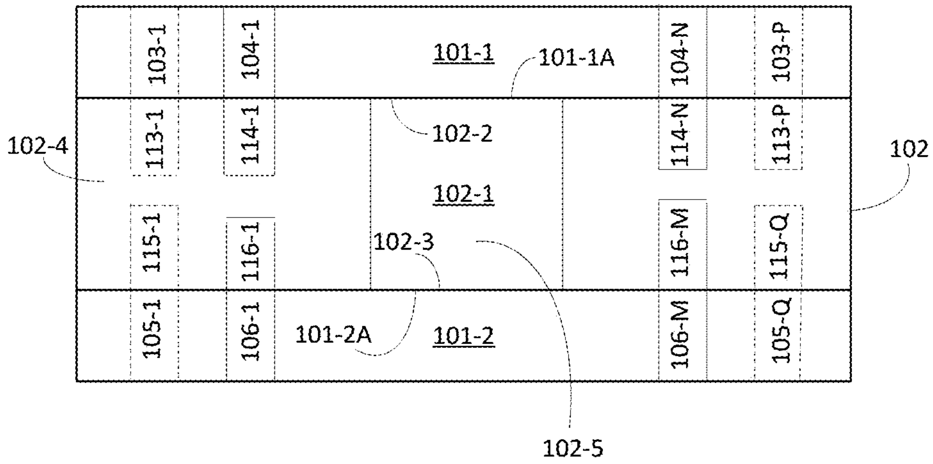
FIG. 1A illustrates a cross-sectional diagram of one embodiment of an atomic sensor including a first cover configured to be aligned to a resonator-cell, and a second cover also configured to be aligned to the resonator-cell.

In the following detailed description, reference is made to the accompanying drawings that form a part hereof, and in which is shown by way of illustration specific illustrative embodiments. However, it is to be understood that other embodiments may be utilized and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention diminish the cost of manufacturing an atomic sensor, e.g., an atomic clock, by self-aligning components of the atomic sensor to one another. Self-alignment techniques allow the optical and electrical components of an atomic sensor to be permanently affixed to the atomic sensor or component(s) thereof. As a result, an atomic sensor implemented with according to embodiments of the invention are less susceptible to error due to shock and vibration.

For pedagogical purposes, the atomic sensor described herein is illustrated as including a first cover, a resonator-cell, and a second cover, where the resonator-cell includes a radio frequency spectrum electromagnetic resonator. Alternatively, the atomic sensor may not include a radio frequency spectrum electromagnetic resonator but rather a generic center structure, e.g., an electrical conductor for example a metal or metal alloy, where the radio frequency spectrum electromagnetic resonator is shown. Like the radio frequency spectrum electromagnetic resonator, such center structure has a void in which the cell resides. Thus, the term "resonator" or "radio frequency spectrum electromagnetic resonator" may be used hereinafter, for pedagogical purposes, in lieu of the term "center structure".

The resonator-cell includes a resonator and a cell in the resonator. The cell is a vacuum chamber including a vapor of atoms, e.g., a vapor of alkali atoms such as rubidium or cesium. Atomic sensor components are aligned in and/or on each of the first and the second cover. Each cover is aligned to the resonator-cell chamber. As a result, each of atomic sensor component in a cover is self-aligned to a region of resonator-cell, e.g., the vapor of alkali atoms or the resonator, and/or a component in the other cover. For example, an atomic sensor components on or in the one cover is self-aligned to atomic sensor component on or in the other cover or the cell.

Each cover is aligned to the resonator-cell by mating each of two or more alignment pins into one of two or more guide holes. Each of the additional atomic sensor components is aligned to a cover, and thus also to the resonator-cell, e.g., by form fitting the additional sensor component in a recess in the cover or affixing the additional sensor component to a surface of a pedestal projecting from the cover. Form fitting, in the context of form fitting a component in a recess in a cover, means that a position of the component is oriented by surfaces defining the recess. Form fitting, the context of form fitting a component on a pedestal projecting from a cover, means that a position of the component is oriented by the surface(s) defining the pedestal.

As a result, embodiments of the invention facilitate efficient and accurate alignment of components of the atomic sensor mounted in each of the first and the second covers with the vapor of atoms in the resonator-cell. Embodiments of the invention reduce the amount of labor required to construct an atomic sensor. Further, embodiments of the invention facilitate separation of each cover of the atomic sensor to facilitate repair or analysis of the atomic sensor.

Different configurations of alignment pins and guide holes may be used to self-align each cover to the resonator-cell. Two or more alignment pins may be formed on (e.g., are part of) one or both surfaces of the resonator-cell. Alternatively, two or more guide pins may be formed on (e.g., are part of) surfaces of each cover, or on a surface of one cover and on one surface of the resonator-cell. Guide holes equal in number to the number of alignment pins are formed through or in a cover configured to be attached to a surface of the resonator-cell with the guide pins, or a through a surface of the resonator-cell configured to be attached to a cover with guide pins. For pedagogical purposes, another embodiment is illustrated hereafter and includes guide holes through the first and the second covers and in or through the resonator-cell. External alignment pins are inserted through pairs of a guide hole through a cover and a guide hole through a surface of the resonator-cell.

FIG. 1A illustrates a cross-sectional diagram of one embodiment of an atomic sensor 100A including a first cover 101-1 configured to be aligned to a resonator-cell 102, and a second cover 101-2 also configured to be aligned to the resonator-cell 102. The cell 102-1 is in a void 102-5, e.g., a cylindrical or other shaped void, in an electromagnetic radio frequency spectrum resonator 102-4

The resonator-cell 102 includes the electromagnetic radio frequency spectrum resonator 102-4 and the cell 102-1. The first cover 101-1 has a first cover surface 101-1A. The second cover 101-2 has a second cover surface 101-2A. The resonator-cell (RC) 102 has a first RC surface 102-2 and a second RC surface 102-3 which is opposite the first RC surface 102-2. The first cover surface 101-1A is opposite to and configured to contact the first RC surface 102-2 when the first cover 101-1 is attached to the resonator-cell 102. The second cover surface 101-2A is opposite to and configured to contact the second RC surface 102-3 when the second cover 101-2 is attached to the resonator-cell 102.

Self-alignment of the first cover 101-1 with the resonator-cell 102 is facilitated by a first set of N guide holes 114-1, 114-N in the resonator-cell 102 (and through the first RC surface 102-2 thereof) and a second set of N guide holes 104-1, 104-N in (and through) the first cover 101. N is an integer greater than one. Each guide hole of the first set of N guide holes 114-1, 114-N is configured to be aligned with a unique guide hole of the second set of N guide holes 104-1, 104-N. To facilitate self-alignment of the first cover 101-1 and the resonator-cell 102, an alignment pin is configured to be inserted into each pair of a guide hole of the first set of N guide holes 114-1, 114-N and a guide hole of the second set of N guide holes 104-1, 104-N. Optionally, each of the N alignment pins is press or slip fitted within the aligned guide hole in which the alignment pin is inserted so that the first cover 101-1 and the resonator-cell 102 are aligned, and optionally fixedly attached, to one another.

Self-alignment of the second cover 101-2 with the resonator-cell 102 is facilitated by a third set of M guide holes 116-1, 116-M in the resonator-cell 102 (and through the second RC surface 102-3 thereof) and a fourth set of M guide holes 106-1, 106-M in and through the second cover. M is an integer greater than one. Optionally, M equals N. Each guide hole of the third set of M guide holes 116-1, 116-M is configured to be aligned with a unique guide hole of the fourth set of M guide holes 106-1, 106-M. To facilitate self-alignment of the second cover 101-2 and the resonator-cell 102, an alignment pin is configured to be inserted into each pair of a guide hole of the third set of M guide holes 116-1, 116-M and a guide hole of the fourth set of M guide holes 106-1, 106-M. Optionally, each of the M alignment pins is friction or slip fitted within the aligned guide hole in which the alignment pin is inserted so that the first cover 101-1 and the resonator-cell 102 are aligned, and optionally fixedly attached, to one another.

Optionally, the first cover 101-1, e.g., the first cover surface 101-1A, is attached or further attached to the resonator-cell, e.g., the first RC surface 102-2, using a first attacher. Optionally, the second cover 101-2, e.g., the second cover surface 101-2A, is attached or further attached to the resonator-cell, e.g., the first RC surface 102-2, using a second attacher. An attacher means at least one fastener, e.g., at least one screws, an adhesive, solder, brazing, or any other device or material for performing attachment. Thus, attachment may be a mechanical attachment. For pedagogical purposes, an attacher is subsequently illustrated as a set of threaded screws each of which are screwed into threaded screw holes. Optionally, the screws are screwed and/or tightened in corresponding threaded screw holes after alignment pins have been inserted in corresponding guide holes.

Optionally, self-alignment of the first cover 101-1 with the resonator-cell 102 is facilitated by a first set of P screw holes 113-1, 113-P in the resonator-cell 102 and a second set of P screw holes 103-1, 103-P in and through the first cover 101-1. P is an integer greater than one. Each screw hole of the first set of P screw holes 113-1, 113-P is configured to be aligned with a unique screw hole of the second set of P screw holes 103-1, 103-P. A screw is configured to be screwed into each pair of P aligned screw holes in the first cover 101-1 and the resonator-cell 102; each pair of P aligned screw holes is threaded so as to receive a screw.

Optionally, self-alignment of the second cover 101-2 with the resonator-cell 102 is facilitated by a first set of Q screw holes 115-1, 115-Q in the resonator-cell 102 and a second set of Q screw holes 105-1, 105-Q in and through the first cover 101-1. Q is an integer greater than one. Optionally, P equals Q. Each screw hole of the first set of Q screw holes 115-1, 115-Q is configured to be aligned with a unique screw hole of the second set of P screw holes 105-1, 105-Q. A screw is configured to be screwed into each pair of Q aligned screw holes in the second cover 101-2 and the resonator-cell 102; each pair of Q aligned screw holes is threaded so as to receive a screw.

Figure 1B:
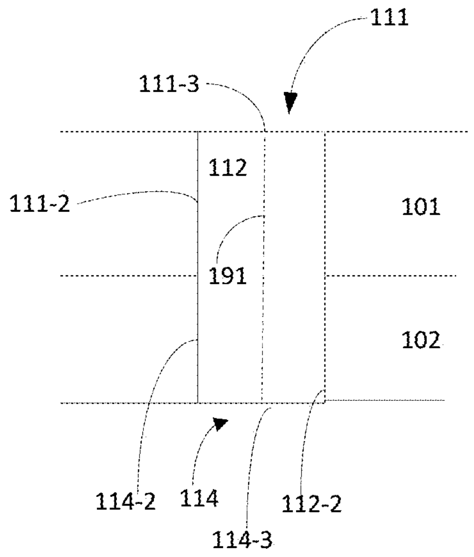
FIG. 1B illustrates a cross-section of one embodiment of an alignment pin inserted into a pair of aligned guide holes in a cover and the resonator-cell.

FIG. 1B illustrates a cross-section of one embodiment of an alignment pin 112 inserted into a pair of aligned guide holes 111, 114 in a cover 101 and the resonator-cell 102. Aligned means that an axis 191 propagates through each of the pair of guide holes 111, 114 and a center 111-3, 114-3 of each guide hole's cross-section. A first guide hole 111 is a void, e.g., a cylindrical void, in solid material, e.g., an electrical conductor, forming at least a portion of the cover 101, e.g., the first or the second cover. The second guide hole is a void, e.g., a cylindrical void, in other solid material, e.g., another electrical conductor, forming at least a portion of the resonator-cell 102. The alignment pin 112 is friction or slip fitted into the first guide hole 111 and at least a portion of the second guide hole 114. For pedagogical purposes, the alignment pin 112 is illustrated in FIG. 1B as being fitted through all of the second guide hole 114. The pair of the first and the second guide holes 111, 114 respectively have a first guide hole perimeter 111-2 and a second guide hole perimeter 114-2 which are aligned to permit the alignment pin 112 being inserted through the first and the second guide holes 111, 114. The alignment pin 112 has pin perimeter 112-2 whose dimensions are slightly smaller than the first and the second guide hole perimeters 111-2, 114-2 so as to facilitate press or slip fitting.

Figure 1C:
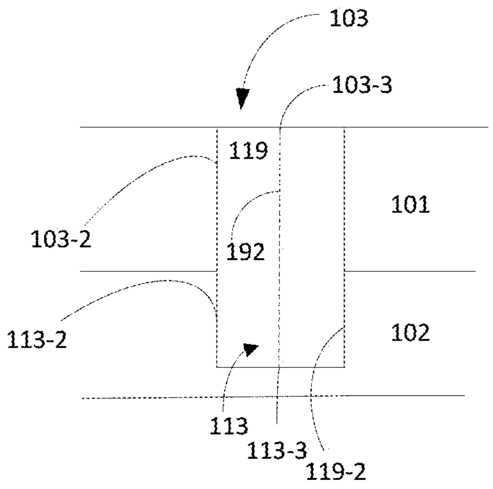
FIG. 1C illustrates a cross-section of one embodiment of a screw inserted into a pair of aligned screw holes in a cover and the resonator-cell.

FIG. 1C illustrates a cross-section of one embodiment of a screw 119 inserted into a pair of aligned screw holes 103, 113 in a cover 101 and the resonator-cell 102. Aligned means that an axis 192 propagates through each of the pair of screw holes 103, 113 and a center 103-3, 113-3 of each guide hole's cross-section. A first screw hole 103 is a void, e.g., a cylindrical void, with threading and in solid material, e.g., an electrical conductor, forming at least a portion of the cover 101, e.g., the first or the second cover. The second screw hole 113 is a void, e.g., a cylindrical void, with threading and in other solid material, e.g., another electrical conductor, forming at least a portion of the resonator-cell 102. The screw 119 is threaded 119-2. A sidewall 103-2 of the first screw hole 103 and all or at least a portion of a sidewall 113-2 of the second screw hole 113 is threaded; the threads of the first and the second screw holes 103, 113 are aligned and the such threads match the threads of the screw 119 so that the screw 119 can be screwed into the first screw hole 103 and all or at least a portion of the second screw hole 113.

Figure 2:
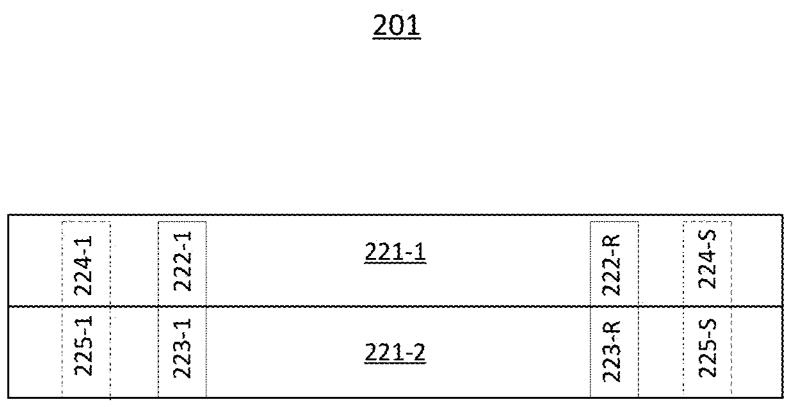
FIG. 2 illustrates a cross-sectional diagram of one embodiment of a cover comprising a first cover portion configured to be aligned to a second cover portion using pairs of guide holes each of which is configured to receive a unique alignment pin.

Optionally, the first and/or the second covers 101-1, 101-2 may each be formed by two or more components which are aligned. FIG. 2 illustrates a cross-sectional diagram of one embodiment of a cover 201 comprising a first cover portion 221-1 configured to be aligned to a second cover portion 221-2 using pairs of guide holes each of which is configured to receive a unique alignment pin. The first cover portion 221-1 includes a first set of R guide holes 222-1, 222-R in the first cover portion 221-1. The second cover portion 221-2 includes a second set of R guide holes 223-1, 223-R in and through the second cover portion 221-2. R is an integer greater than one. Each of R pairs of guide holes comprises a guide hole of the first set of R guide holes 222-1, 222-R and a guide hole of the second set of R guide holes 223-1, 223-R. Each of the R pairs of guide holes is configured to receive a unique alignment pin of a set of R alignment pins. Optionally, each of the R alignment pins is press or slip fitted within the aligned guide hole in which the alignment pin is inserted so that the first cover portion 221-1 and the second cover portion 221-2 aligned, and optionally fixedly attached, to one another.

Optionally, an attacher is used to attach the first cover portion 221-1, e.g., to a surface thereof, to the second cover portion 221-2, e.g., to a surface thereof. For pedagogical purposes, the attacher is illustrated as being implemented with screws received by screw holes. The first cover portion 221-1 includes a first set of S screw holes 224-1, 224-S. The second cover portion 221-2 includes a second set of S screw holes 225-1, 225-S in the first cover 101-1. S is an integer greater than one. A first pair of screw holes comprises aligned screw holes 224-1, 225-1 in the first and the second cover portions 221-1, 221-2. A Sth pair of screw holes comprises other aligned screw holes 224-S, 225-S in the first and the second cover portions 221-1, 221-2. Each pair of screw holes is formed with threads (as discussed elsewhere herein) and is configured to receive a unique screw.

Figure 3A:
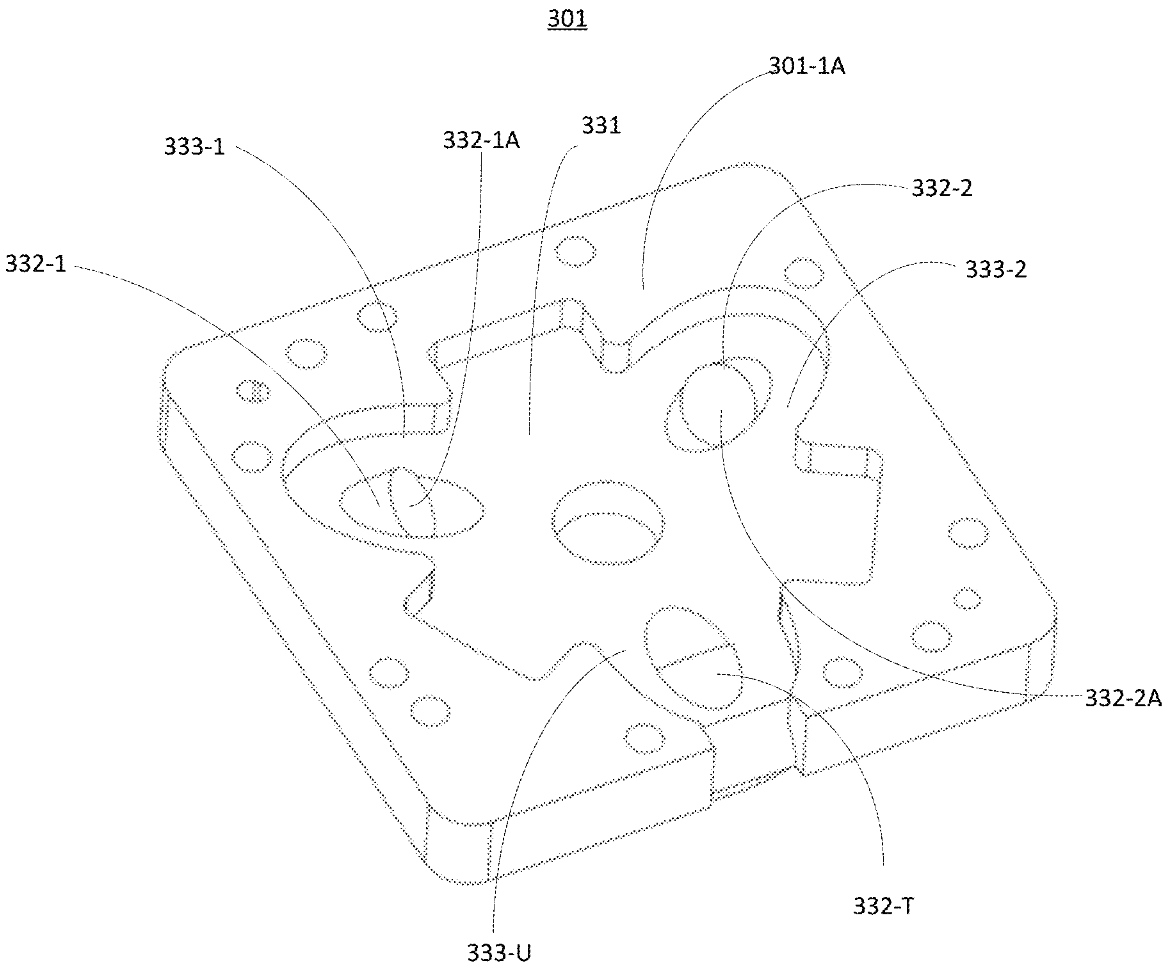
FIG. 3A illustrates a diagram of one embodiment of a cover.

Each cover may have at least of: at least one pedestal and at least one recess. For pedagogical purposes, FIG. 3A illustrates a diagram of one embodiment of a cover 301 (e.g., the first or the second cover 101-1, 101-2) including a set of T pedestals 332-1, 332-2, 332-T and a set of U recesses 333-1, 333-2, 333-U respectively on and in which components of an atomic sensor are configured to be aligned. Each recess is configured to be opposite, e.g., face, the resonator-coil. The illustrated cover 301 has a cover surface 301-1A (i.e., the first or second cover surface 101-1A, 101-2A described elsewhere herein) and a recessed cover surface 331 which is recessed in the cover 301 from the cover surface 301-1A; thus, the recessed cover surface does not contact a surface 102-2, 102-3 of the resonator-cell 102.

Pedestal means a base or support for another object, e.g., a component of the resonator-cell 102. Each pedestal 332-1, 332-2, 332-T has a pedestal surface 332-1A, 332-2A which is configured to be opposite to (e.g., facing), but not necessarily parallel with, the first RC surface 102-2 or the second RC surface 102-3 of the resonator-cell 102. The form of each pedestal and of each recess illustrated in FIG. 3A is for pedagogical purposes only. One or more pedestals of the set of T pedestals 332-1, 332-2, 332-T may be formed in different ways. One or more recesses of the set of U recesses 333-1, 333-2, 333-U may be formed in different ways.

In embodiments of the invention, the cover 301 includes at least one of: the set of T pedestals and the set of U recesses. The pedestals of the set of T pedestals may be the same or different. The recesses of the set of U recesses may be the same or different. Each pedestal, of the set of T pedestals, projects a recessed surface 331 of the cover 301. At least a portion of the recessed surface 331 is configured to face the cell 102-1.

Each of the recesses of the U recesses is formed with the recessed surface 331. FIG. 3A illustrates for pedagogical purposes that each recess is formed by both the recessed surface 331 and the cover surface 301-1A (i.e., a recess in the cover surface 301-1A whose bottom is the recessed surface); however, one or more recesses may be formed in other ways, e.g., as a recess solely in the recessed surface 331. Each of T and U is an integer greater than zero.

Because each recess and each pedestal is formed as part of the cover 301, each recess and each pedestal is necessarily aligned to the cover 301. When the cover 301 is attached to the resonator-cell 102, each recess and each pedestal is also necessarily aligned with the resonator-cell 102 or a region or component thereof. Optionally, each recess is configured to be self-aligned with either the resonator (or a portion thereof) or with the vapor of atoms, or even a portion of another cover other than the over in which the recess is located. Optionally, each pedestal, or pedestal surface, is self-aligned with the vapor of atoms; optionally, this may be achieved in part by tilting pedestal surface(s) 332-1A, 332-2A with respect to a cover surface 301-1A of the cover 301.

Figure 3B:
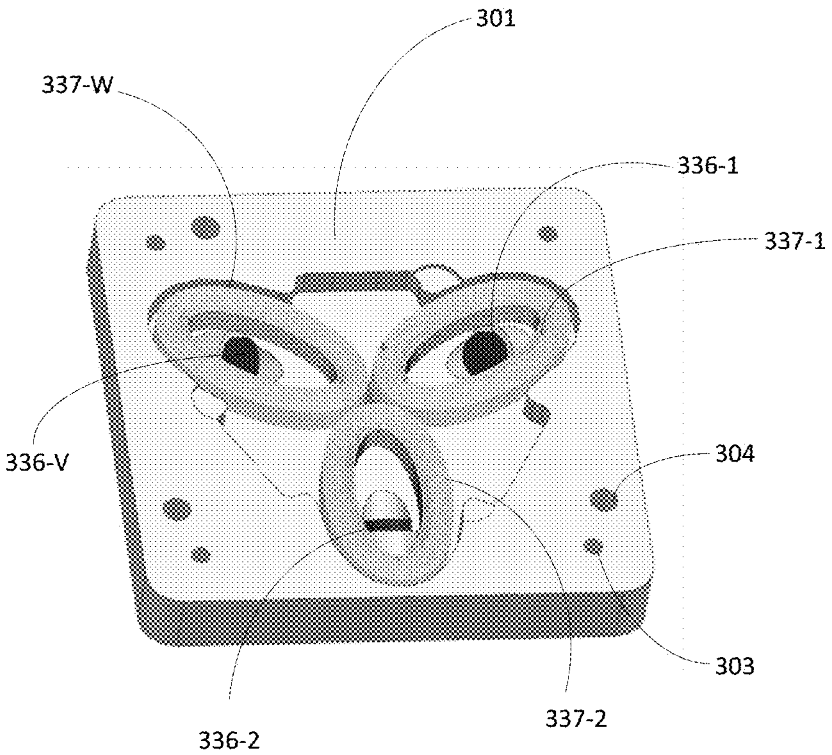
FIG. 3B illustrates another diagram of one embodiment of the cover.

FIG. 3B illustrates another diagram of one embodiment of the cover 301 (e.g., the first or the second cover 101-1, 101-2) in which a set of V first atomic sensor components 336-1, 336-2, 336-V are aligned on the set of T pedestals 332-1, 332-2, 332-T and a second set of W second atomic sensor components are aligned in the set of U recesses 333-1, 333-2, 333-U. Each of the set of V first atomic sensor components 336-1, 336-2, 336-V and each of the second set of W second atomic sensor components may include different types of atomic sensor components. The cover 301 includes at least one guide hole 304 and at least one screw hole 303.

Each of the set of V first atomic sensor components 336-1, 336-2, 336-V is aligned to the cover 301 when affixed to (or mounted on) a unique pedestal of the set of T pedestals 332-1, 332-2, 332-T. Optionally, self-alignment of a first atomic sensor component mounted on a pedestal is achieved by a tilt or lack of tilt of the pedestal surface. Self-alignment may be achieved in numerous other ways. Optionally and possibly additionally, the first atomic sensor component has a perimeter equivalent to a perimeter of the pedestal surface upon which it is mounted; first atomic sensor component is configured to be mounted on the pedestal surface so that the perimeters of each are aligned. Optionally, and possibly additionally, a key is formed on and projects from the pedestal surface and is configured to be inserted into a notch in the first atomic sensor component. Optionally, the first atomic sensor component may be affixed in the recess with an adhesive material, a solder, or another type of attachment material. Optionally, when a first atomic sensor component is a mirror affixed to a pedestal surface, the mirror is configured to reflect an optical beam, projected through the vapor of atoms in the cell, back through the vapor of atoms in the cell. Thus, optionally, a mirror is aligned with both the vapor of atoms in the cell and an optical emitter in the cover that is different than the cover in which the mirror is mounted.

Self-alignment of a second atomic sensor component affixed (or mounted) in in a recess is achieved by the recess, and optionally one or more other second atomic sensor components and/or one or more other structures, e.g., pedestal(s), formed on or in the recessed cover surface 331. The recess and optionally the one or more other second atomic sensor components and/or the one or more other structure facilitate form fitting the second atomic sensor component in a unique recess and define a position of the second atomic sensor. Optionally, the second atomic sensor component may be affixed in the recess with an adhesive material, a solder, or another type of attachment material.

For pedagogical purposes, each of the set of V first atomic sensor components 336-1, 336-2, 336-V are illustrated as being a same type of component, e.g., a wire coil. Alternatively, the set of V first atomic sensor components 336-1, 336-2, 336-V may comprise two or more different types of atomic sensor components. Optionally, each first atomic sensor component may be a wire coil, a mirror, a photosensor, or an optical emitter. An optical emitter may be a laser or a photonic grating. Optionally, one of the first and the second covers may include the set of V first atomic sensor components 336-1, 336-2, 336-V where each first atomic sensor component is a wire coil, a mirror, or a photosensor. Optionally, a photosensor is a photodetector.

For pedagogical purposes, each of the set of W second atomic sensor components 337-1, 337-2, 337-W are illustrated as being a same type of component, e.g., a mirror. Alternatively, the set of W second atomic sensor components 337-1, 337-2, 337-W may comprise two or more different types of atomic sensor components. Optionally, each second atomic sensor component may be a wire coil, a mirror, a photosensor, or an optical emitter. Optionally, one of the first and the second covers may include the set of W second atomic sensor components 337-1, 337-2, 337-W where each second atomic sensor component is a wire coil, a mirror, or a photosensor. A photonic grating means an optical element having a grating pattern that bends an optical beam, e.g., emitted from an optical source or an optical waveguide, into an optical beam propagating in a direction different from a direction in which the optical beam was emitted from the optical source or optical waveguide.

Figure 3C:
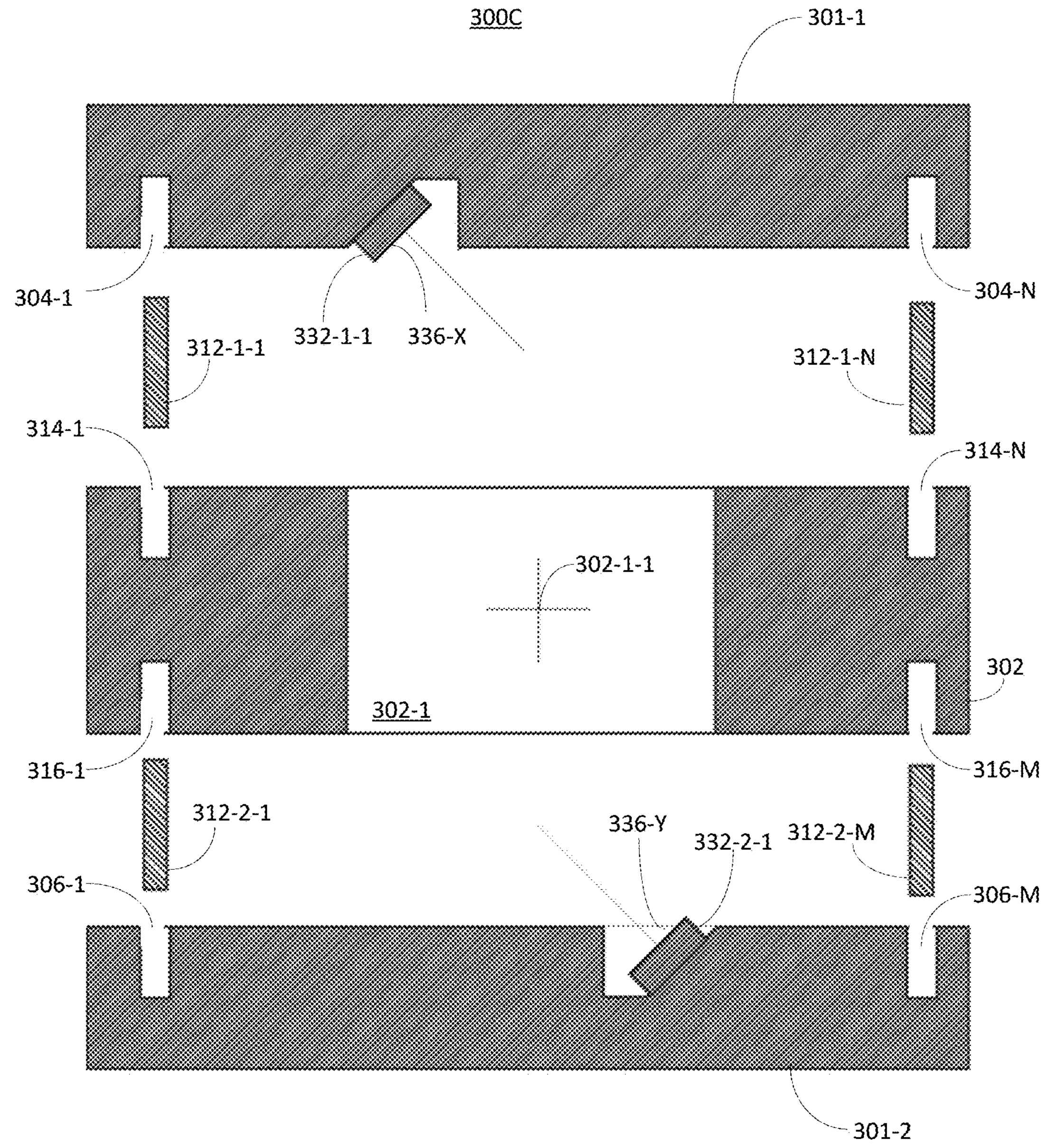
FIG. 3C illustrates a cross-sectional diagram of one embodiment of a dissembled atomic sensor.

FIG. 3C illustrates a cross-sectional diagram of one embodiment of a dissembled atomic sensor 300C including a first cover 301-1 configured to be aligned to a resonator-cell 302, and a second cover 301-2 also configured to be aligned to the resonator-cell 302. The first cover 301-1 includes the second set of N guide holes 304-1, 304-N in (and optionally through) the first cover 301-1, a first pedestal 332-1-1, and a first atomic sensor component 336-X mounted on the pedestal 332-1-1. The second cover 301-2 includes the fourth set of M guide holes 306-1, 306-M, a second pedestal 332-2, and a second atomic sensor component 336-Y mounted on the second pedestal 332-2-1. Optionally and for pedagogical purposes, each of the first and the second atomic sensor components 336-X, 336-Y may be an optical emitter, an optical detector, or a mirror. The resonator-cell 302 includes the cell 302-1 which has a geometric center 302-1-1, the first set of N guide holes 314-1, 314-N, and the third set of M guide holes 316-1, 316-M. Thus, a portion of the resonator-cell 302 may include the cell 302-1 and/or the geometric center 302-1-1 of the cell 302-1

A first alignment pin 312-1-1 is configured to be inserted into a first guide hole 314-1 of the first set of N guide holes and a first guide hole 304-1 of the second set of N guide holes. A Nth alignment pin 312-1-N is configured to be inserted into a Nth guide hole 314-N of the first set of N guide holes and a Nth guide hole 304-N of the second set of N guide holes. A second alignment pin 312-2-1 is configured to be inserted into a first guide hole 316-1 of the third set of M guide holes and a first guide hole 316-1 of the fourth set of M guide holes. A Mth alignment pin 312-1-M is configured to be inserted into a Mth guide hole 316-M of the third set of M guide holes and a Mth guide hole 306-M of the fourth set of M guide holes.

Figure 3D:
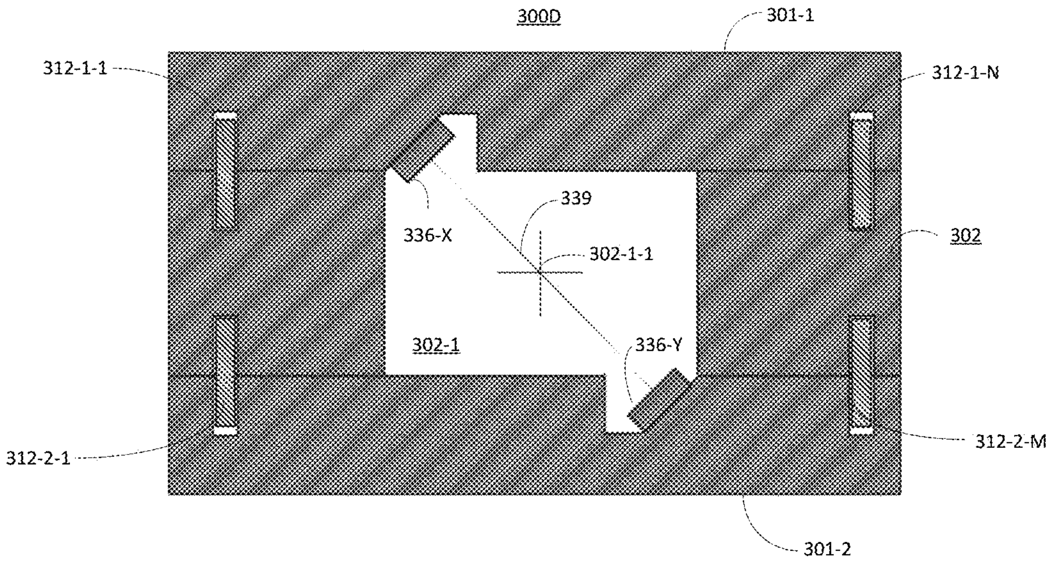
FIG. 3D illustrates a cross-sectional diagram of one embodiment of an assembled atomic sensor.

FIG. 3D illustrates a cross-sectional diagram of one embodiment of an assembled atomic sensor 300D comprising a first atomic sensor component 336-X mounted in the first cover 301-1 and a second atomic sensor component 336-Y mounted in the second cover 301-2, that are self-aligned with one another and with a portion of the resonator-cell 302, e.g., the cell 302-1 (e.g., a geometric center of the cell 302-1) or a vapor of atoms in the cell 302-1. Self-alignment occurs because: (a) each cover 301-1, 301-2 is with the resonator-cell 302 by insertion of each guide pin in a pairs of guide holes which are in a cover 301-1, 301-2 and the resonator-cell 302, and the alignment of atomic sensor component(s) in each cover 301-1, 301-2.

The elements numbers in FIG. 3D are consistent with the element numbers in FIG. 3D. Due to self-alignment of atomic sensor components, when at least one of the first and second atomic sensor components is an optical emitter and the other one of the first and second atomic sensor components is either an optical emitter, an optical sensor, or a mirror, then one or more optical beams 339 will be emitted and intersect a region of the cell 302-1, e.g., the geometric center 302-1-1 of the cell 302-1. Due to self-alignment of atomic sensor components, when at least one of the first and second atomic sensor components is an optical emitter and the other one of the first and second atomic sensor components is either an optical sensor or a mirror, then a single optical beam 339 will be emitted from the atomic sensor component that is the optical emitter, intersect a region of the cell 302-1, e.g., the geometric center 302-1-1 of the cell 302-1, and be received by the other atomic sensor component that is either a mirror or an optical detector.

Figure 4:
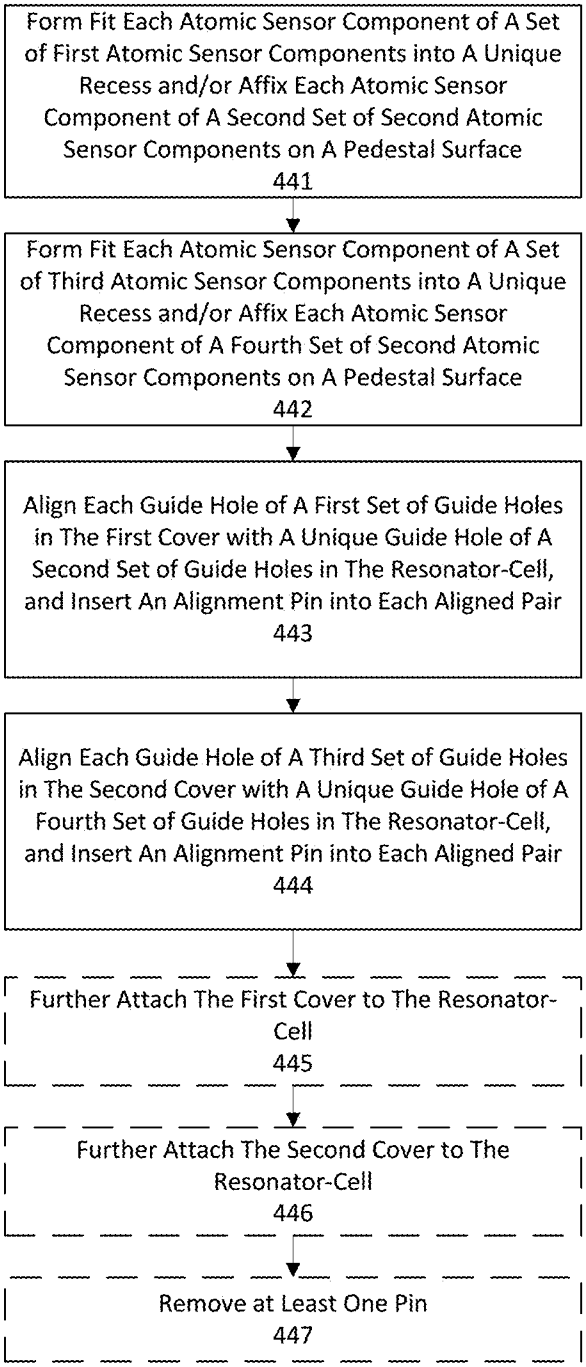
FIG. 4 illustrates a flow diagram of an exemplary method for self-aligning components of an atomic sensor with respect to other components of the atomic sensor.

FIG. 4 illustrates a flow diagram of an exemplary method 440 for self-aligning components of an atomic sensor (e.g., the optical emitter, the mirror, the photosensor, and/or the wire coils) with respect to other components of the atomic sensor, e.g., a portion of the resonator, e.g., the vapor of atoms, and/or the optical emitter. Exemplary method 440 may be implemented by one or more of the apparatuses illustrated in FIGS. 1A-3. To the extent the methods herein are described herein as being implemented with one or more of the apparatuses illustrated in FIGS. 1A-3, it is to be understood that other embodiments can be implemented in other ways. Techniques described with respect to the embodiments illustrated by FIGS. 1A-3 may be applicable to the method 440.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 441, each atomic sensor component of a set of first atomic sensor components is form fitted into a unique a recess, formed with or defined by a first recessed cover surface in a first cover, and/or each atomic sensor component of a set of second atomic sensor components is affixed to a pedestal surface of a unique pedestal projecting from the first recessed cover surface. Each of the foregoing sets may include one or more atomic sensor components. Optionally, the types of the first and the second atomic sensor components may be the types illustrated elsewhere herein respectively for form fitting into a recess and for affixing on a pedestal surface. Optionally, each of the set of first atomic sensor components mounted in a recess of the first cover or on a pedestal surface of the first cover is configured to be self-aligned with portion(s) of the resonator-cell and/or the second cover as further described elsewhere herein.

In block 442, each atomic sensor component of a set of third atomic sensor components is form fitted into a unique a recess, formed with a second recessed cover surface in a second cover, and/or each atomic sensor component of a set of fourth atomic sensor components is affixed to a pedestal surface of a unique pedestal projecting from the second recessed cover surface. Each of the foregoing sets may include one or more atomic sensor components. Optionally, the types of the third and the fourth atomic sensor components may be the types illustrated elsewhere herein respectively for form fitting into a recess and for affixing on a pedestal surface. Optionally, each of the set of third atomic sensor components mounted in a recess of the second cover or on a pedestal surface of the second cover is configured to be self-aligned with portion(s) of the resonator-cell and/or the first cover as further described elsewhere herein.

In block 443, each guide hole of a first set of guide holes in the first cover is aligned with a unique guide hole of a second set of guide holes in the resonator-cell, and an alignment pin is inserted into each aligned pair of a guide hole of the first set of guide holes and a guide hole of the second set of guide holes (or first type of aligned pair of guide holes). Block 443 may be accomplished in a different way. Optionally, the following may be performed sequentially: one first type of aligned pair of guide holes may be aligned and an alignment pin inserted into such aligned pair of guide holes. Alternatively, the following may be performed sequentially: more than one first type of aligned pair of guide holes, e.g., all first type of aligned pairs of guide holes, may be aligned and an alignment pin inserted (sequentially or at the substantially the same time) into each of such more than one first type aligned pair of guide holes.

In block 444, each guide hole of a third set of guide holes in the second cover is aligned with a unique guide hole of a fourth set of guide holes in the resonator-cell, and an alignment pin is inserted into each aligned pair of a guide hole of the third set of guide holes and a guide hole of the fourth set of guide holes (or second type of aligned pair of guide holes). Block 444 may be accomplished in a different way. Optionally, the following may be performed sequentially: one second type of aligned pair of guide holes may be aligned and an alignment pin inserted into such aligned pair of guide holes. Alternatively, the following may be performed sequentially: more than one second type of aligned pair of guide holes, e.g., all second type of aligned pairs of guide holes, may be aligned and an alignment pin inserted (sequentially or at the substantially the same time) into each of such more than one second type aligned pair of guide holes.

In optional block 445, further attach the first cover to the resonator-cell, e.g., as illustrated elsewhere herein. Optionally, such attachment is performed with screws and screw holes as described elsewhere herein. Each screw hole of a in the first cover is aligned with a unique screw hole of a second set of threaded screw holes in the resonator-cell, and a screw is inserted into each first type pair of aligned screw holes. Each first type pair of aligned screw holes includes one screw hole of the first set and one screw hole of the second set. Such attachment with screws may be performed in different ways. Optionally, the following may be performed sequentially: one first type pair of screw holes may be aligned and a screw screwed in such first type pair of aligned screw holes. Alternatively, the following may be performed sequentially: more than one first type pair of screw holes, e.g., all first type pairs of screw holes, may be aligned and a screw screwed (sequentially or at the substantially the same time) into each of such more than one first type pair of aligned screw holes.

In optional block 446, further attach the second cover to the resonator-cell, e.g., as illustrated elsewhere herein. Optionally, such attachment is performed with screws and screw holes as described elsewhere herein. Each screw hole of a third set of threaded screw holes in the second cover is aligned with a unique screw hole of a fourth set of threaded screw holes in the resonator-cell, and a screw is inserted into each third type pair of aligned screw holes. Each first type pair of aligned screw holes includes one screw hole of the first set and one screw hole of the second set. Such attachment with screws may be performed in different ways. Optionally, the following may be performed sequentially: one first type pair of screw holes may be aligned and a screw screwed in such first type pair of aligned screw holes. Alternatively, the following may be performed sequentially: more than one first type pair of screw holes, e.g., all first type pairs of screw holes, may be aligned and a pin inserted (sequentially or at the substantially the same time) into each of such more than one first type pair of aligned screw holes. In optional block 447, at least one pin is removed from a first and/or second type of aligned pair(s) of guide holes.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher,"

"lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes an apparatus for self-aligning components of an atomic sensor, the apparatus comprising: a center structure-cell (SC) comprising a first SC surface, a second SC surface opposite the first SC surface, a center structure, and a cell which is in the center structure and which contains a vapor of atoms; a first cover comprising a first cover surface contacting the first SC surface, a first recessed surface facing the first SC surface, and at least one of: one or more first pedestals and one or more first recesses, wherein each first pedestal projects from the first recessed surface and has a first pedestal surface facing the center structure-cell, and wherein each first recess is formed with the first recessed surface and faces the center structure-cell; at least one of: (a) a first set of atomic sensor components, wherein each atomic sensor component, of the first set of atomic sensor components, is affixed to the first pedestal surface of a unique first pedestal and is self-aligned with respect to at least one of a portion of the center structure-cell and an atomic sensor component of one of a third set of atomic sensor components and a fourth set of atomic sensor components; and (b) a second set of atomic sensor components, wherein each atomic sensor component, of the second set of atomic sensor components, is form fitted in a unique first recess and is self-aligned with respect to at least one of a portion of the center structure-cell and an atomic sensor component of one of the third set of atomic sensor components and the fourth set of atomic sensor components; at least one of: a first set of N guide holes each of which is in the center structure-cell and through the first SC surface and a second set of N guide holes each of which is through the first cover; N alignment pins each which is inserted into either: (a) a guide hole of the first set of N guide holes, (b) a guide hole of the second set of N guide holes, or (c) a pair of a guide hole of the first set of N guide holes and a guide hole of the second set of N guide holes, wherein N is an integer greater than one; a second cover comprising a second cover surface configured to contact the second SC surface, a second recessed surface configured to face the second SC surface, and at least one of: one or more second pedestals and one or more second recesses, wherein each second pedestal projects from the second recessed surface and has a second pedestal surface facing the center structure-cell, and wherein each second recess is formed with the second recessed surface and faces the center structure-cell; at least one of: a third set of M guide holes in the center structure-cell and through the second SC surface and a fourth set of M guide holes each of which is through the second cover; M alignment pins each which is inserted into either: (a) a guide hole of the third set of M guide holes, (b) a guide hole of the fourth set of M guide holes, or (c) a pair of a guide hole of the third set of M guide holes and a guide hole of the fourth set of M guide holes, wherein M is an integer greater than one; at least one of: a third set of atomic sensor components, wherein each atomic sensor component, of the third set of atomic sensor components, is affixed to a first pedestal surface of a unique first pedestal and is self-aligned with respect to at least one of a portion of the center structure-cell and an atomic sensor component of one of the first set of atomic sensor components and the second set of atomic sensor components; and a fourth set of atomic sensor components, wherein each atomic sensor component, of the fourth set of atomic sensor components is form fitted in a unique second recess and is self-aligned with respect to at least one of a portion of the center structure-cell and an atomic sensor component of one of the first set of atomic sensor components and the second set of atomic sensor components.

Example 2 includes the apparatus of Example 1, wherein each of the N alignment pins is attached to the first cover or the center structure-cell.

Example 3 includes the apparatus of any of Examples 1-2, wherein each of the M alignment pins is attached to the second cover or the center structure-cell.

Example 4 includes the apparatus of any of Examples 1-3, wherein each of the first and the third sets of atomic sensor components comprises at least one of: at least one optical emitter, at least one wire coil, at least one mirror, and at least one photosensor.

Example 5 includes the apparatus of any of Examples 1-4, wherein each of the second and the fourth sets of atomic sensor components comprises at least one of: at least one optical emitter, at least one wire coil, at least one mirror, and at least one photosensor.

Example 6 includes the apparatus of any of Examples 1-5, further comprising: a first attacher which attaches the first cover to the center structure-cell; and a second attacher which attaches the second cover to the center structure-cell.

Example 7 includes the apparatus of Example 6, wherein the first attacher comprises: a first set of p threaded screw holes, each of which is in the center structure-cell and through the first SC surface; a second set of p threaded screw holes each of which is each of which is through the first cover; and p screws each which is screwed into a pair of a screw hole of the first set of p threaded screw holes and a screw hole of the second set of p threaded screw holes, wherein p is an integer greater than one; wherein the second attacher comprises: a first set of q threaded screw holes, each of which is in the center structure-cell and through the first SC surface; a second set of q threaded screw holes each of which is each of which is through the first cover; and Q screws each which is screwed into a pair of a screw hole of the first set of Q threaded screw holes and a screw hole of the second set of Q threaded screw holes, wherein Q is an integer greater than one.

Example 8 includes the apparatus of any of Examples 1-7, wherein the first cover or the second cover comprises: a first cover portion; a second cover portion; at least one of: a first set of R guide holes each of which is in the first cover portion and a second set of R guide holes each of which is through the second cover portion; and R alignment pins each which is inserted into either: (a) a guide hole of the first set of R guide holes, (b) a guide hole of the second set of R guide holes, or (c) a pair of a guide hole of the first set of R guide holes and a guide hole of the second set of R guide holes, wherein R is an integer greater than one.

Example 9 includes the apparatus of Example 8, further comprising a third attacher which attaches the first cover portion to the second cover portion.

Example 10 includes the apparatus of Example 9, wherein the third attacher comprises: a first set of J threaded screw holes, each of which is in the first cover portion; a second set of J threaded screw holes each of which is each of which is through the second cover; and J screws each which is screwed into a pair of a screw hole of the first set of J threaded screw holes and a screw hole of the second set of J threaded screw holes, wherein J is an integer greater than one.

Example 11 includes the apparatus of any of Examples 1-10, wherein M equals N; wherein each guide hole of the first set of N guide holes and a guide hole of the third set of M guide holes are a single guide hole through the center structure-cell.

Example 12 includes a method for self-aligning components of an atomic sensor including a center structure-cell, a first cover, and a second cover, the method comprising: at least one of: (a) form fitting each atomic sensor component of a set of first atomic sensor components into a unique a recess in the first cover and (b) affixing each atomic sensor component of a set of second atomic sensor components to a pedestal surface of a unique pedestal projecting from the first cover; at least one of: (a) form fitting each atomic sensor component of a set of third atomic sensor components into a unique a recess in the second cover and/or (b) affixing each atomic sensor component of a set of fourth atomic sensor components to a pedestal surface of a unique pedestal projecting from the second cover; aligning each guide hole of a first set of guide holes in the first cover is aligned with a unique guide hole of a second set of guide holes in the center structure-cell, and inserting an alignment pin into each aligned pair of a guide hole of the first set of guide holes and a guide hole of the second set of guide holes; and aligning each guide hole of a third set of guide holes in the second cover with a unique guide hole of a fourth set of guide holes in the center structure-cell, and inserting an alignment pin into each aligned pair of a guide hole of the third set of guide holes and a guide hole of the fourth set of guide holes; wherein each of the first and the second atomic sensor components is self-aligned with respect to at least one of a portion of the center structure-cell and a third or a fourth atomic sensor component; wherein each of the third and the fourth atomic sensor components is self-aligned with respect to at least one of a portion of the center structure-cell and a first or a second atomic sensor component.

Example 13 includes the method of Example 12, further comprising at least one of: further attaching the first cover to the center structure-cell and further attaching the second cover to the center structure-cell.

Example 14 includes the method of Example 13, wherein further attaching comprises screwing each of at least one screw into a pair of align screw holes in a cover and in the center structure-cell.

Example 15 includes the method of any of Examples 12-14, further comprising removing at least one inserted pin.

Example 16 includes an atomic sensor, comprising: a center structure-cell (SC) comprising a center structure, a cell which is in the center structure and which contains a vapor of atoms, and a first set of guide holes, a first SC surface and a second SC surface opposite the first SC surface; a first cover comprising (a) a second set of guide holes and (b) at least one of: a first set of recesses in a first surface of the first cover and a first set of pedestals projecting from the first surface of the first cover, wherein each recess of the first set of recesses is form fitted with either a wire coil, a mirror, or a photosensor, and wherein either a wire coil, a mirror, or a photosensor is mounted on each pedestal of the first set of pedestals; and a second cover comprising (a) a third set of guide holes and (b) at least one of: a second set of recesses in a second surface of the second cover and a second set of pedestals projecting from the second surface of the first cover, wherein each recess of the second set of recesses is form fitted with either a photonic grating, wire coil, a mirror, or a photosensor, and wherein either a photonic grating, a wire coil, a mirror, or a photosensor is mounted on each pedestal of the second set of pedestals; wherein the first cover is mechanically attached to the center structure-cell; wherein the first surface is adjacent to the first SC surface; wherein the second cover is mechanically attached to the center structure-cell; wherein the second surface is adjacent to the second SC surface; wherein each guide hole of the first set of guide holes configured to be aligned, with a guide hole of at least one of the second set of guide holes and the third set of guide holes, forming a set of aligned guide holes; wherein component on a pedestal or in a recess of the first or the second cover is self-aligned with at least one of a portion of the center structure-cell and a component on a pedestal or in a recess of respectively the second or first cover.

Example 17 includes the atomic sensor of Example 16, wherein each set of aligned guide holes is configured to receive an alignment pin configured to align and attach the cell, the first cover, and the second cover.

Example 18 includes the atomic sensor of Example 17, wherein the center structure-cell further comprises a first set of threaded screw holes; wherein the first cover comprises a second set of threaded screw holes; wherein the second cover comprises a third set of threaded screw holes; wherein each screw hole of the first set of threaded screw holes is configured to be aligned, with a threaded screw hole of at least one of each of the second set of threaded screw holes and the third set of threaded screw holes, forming a set of aligned screw holes; and wherein each set of aligned threaded screw holes is configured to receive a screw which is tightened after alignment pins are received.

Example 19 includes the atomic sensor of any of Examples 16-18, wherein each set of aligned guide holes is configured to contemporaneously receive a pin configured to align the cell, the first cover, and the second cover.

Example 20 includes the atomic sensor of any of Examples 16-19, wherein the first cover comprises a first pin set comprising at least two pins projecting from the first surface and each pin of the first pin set is configured to be inserted into a unique hole in the first SC surface; and wherein the second cover comprises a second pin set comprising at least two pins projecting from the second surface and each pin of the second pin set is configured to be inserted into a unique hole in the second SC surface.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus for self-aligning components of an atomic sensor, the apparatus comprising:

a center structure-cell (SC) comprising a first SC surface, a second SC surface opposite the first SC surface, a center structure, and a cell which is in the center structure and which contains a vapor of atoms;

a first cover comprising a first cover surface contacting the first SC surface, a first recessed surface facing the first SC surface, and at least one of: one or more first pedestals and one or more first recesses, wherein each first pedestal projects from the first recessed surface and has a first pedestal surface facing the center structure-cell, and wherein each first recess is formed with the first recessed surface and faces the center structure-cell;

at least one of:

(a) a first set of atomic sensor components, wherein each atomic sensor component, of the first set of atomic sensor components, is affixed to the first pedestal surface of a unique first pedestal and is self-aligned with respect to at least one of a portion of the center structure-cell and an atomic sensor component of one of a third set of atomic sensor components and a fourth set of atomic sensor components; and (b) a second set of atomic sensor components, wherein each atomic sensor component, of the second set of atomic sensor components, is form fitted in a unique first recess and is self-aligned with respect to at least one of a portion of the center structure-cell and an atomic sensor component of one of the third set of atomic sensor components and the fourth set of atomic sensor components;

at least one of: a first set of N guide holes each of which is in the center structure-cell and through the first SC surface and a second set of N guide holes each of which is through the first cover;

N alignment pins each of which is inserted into either: (a) a guide hole of the first set of N guide holes, (b) a guide hole of the second set of N guide holes, or (c) a pair of a guide hole of the first set of N guide holes and a guide hole of the second set of N guide holes, wherein N is an integer greater than one;

a second cover comprising a second cover surface configured to contact the second SC surface, a second recessed surface configured to face the second SC surface, and at least one of: one or more second pedestals and one or more second recesses, wherein each second pedestal projects from the second recessed surface and has a second pedestal surface facing the center structure-cell, and wherein each second recess is formed with the second recessed surface and faces the center structure-cell;

at least one of: a third set of M guide holes in the center structure-cell and through the second SC surface and a fourth set of M guide holes each of which is through the second cover;

M alignment pins each of which is inserted into either: (a) a guide hole of the third set of M guide holes, (b) a guide hole of the fourth set of M guide holes, or (c) a pair of a guide hole of the third set of M guide holes and a guide hole of the fourth set of M guide holes, wherein M is an integer greater than one;

at least one of:

(a) the third set of atomic sensor components, wherein each atomic sensor component, of the third set of atomic sensor components, is affixed to a second pedestal surface of a unique second pedestal and is self-aligned with respect to at least one of a portion of the center structure-cell and an atomic sensor component of one of the first set of atomic sensor components and the second set of atomic sensor components; and (b) the fourth set of atomic sensor components, wherein each atomic sensor component, of the fourth set of atomic sensor components is form fitted in a unique second recess and is self-aligned with respect to at least one of a portion of the center structure-cell and an atomic sensor component of one of the first set of atomic sensor components and the second set of atomic sensor components.

2. The apparatus of claim 1, wherein each of the N alignment pins is attached to the first cover or the center structure-cell.

3. The apparatus of claim 1, wherein each of the M alignment pins is attached to the second cover or the center structure-cell.

4. The apparatus of claim 1, wherein each of the first and the third sets of atomic sensor components comprises at least one of: at least one optical emitter, at least one wire coil, at least one mirror, and at least one photosensor.

5. The apparatus of claim 1, wherein each of the second and the fourth sets of atomic sensor components comprises at least one of: at least one optical emitter, at least one wire coil, at least one mirror, and at least one photosensor.

6. The apparatus of claim 1, further comprising:

a first attacher which attaches the first cover to the center structure-cell; and a second attacher which attaches the second cover to the center structure-cell.

7. The apparatus of claim 6, wherein the first attacher comprises:

a first set of p threaded screw holes, each of which is in the center structure-cell and through the first SC surface;

a second set of p threaded screw holes each of which is through the first cover; and p screws each of which is screwed into a pair of a screw hole of the first set of p threaded screw holes and a screw hole of the second set of p threaded screw holes, wherein p is an integer greater than one;

wherein the second attacher comprises:

a first set of q threaded screw holes, each of which is in the center structure-cell and through the first SC surface;

a second set of q threaded screw holes each of which is through the first cover; and Q screws each of which is screwed into a pair of a screw hole of the first set of Q threaded screw holes and a screw hole of the second set of Q threaded screw holes, wherein Q is an integer greater than one.

8. The apparatus of claim 1, wherein the first cover or the second cover comprises:

a first cover portion;

a second cover portion;

at least one of: a first set of R guide holes each of which is in the first cover portion and a second set of R guide holes each of which is through the second cover portion; and R alignment pins each which is inserted into either: (a) a guide hole of the first set of R guide holes, (b) a guide hole of the second set of R guide holes, or (c) a pair of a guide hole of the first set of R guide holes and a guide hole of the second set of R guide holes, wherein R is an integer greater than one.

9. The apparatus of claim 8, further comprising a third attacher which attaches the first cover portion to the second cover portion.

10. The apparatus of claim 9, wherein the third attacher comprises:

a first set of J threaded screw holes, each of which is in the first cover portion;

a second set of J threaded screw holes each of which is through the second cover; and J screws each which is screwed into a pair of a screw hole of the first set of J threaded screw holes and a screw hole of the second set of J threaded screw holes, wherein J is an integer greater than one.

11. The apparatus of claim 1, wherein M equals N;

wherein each guide hole of the first set of N guide holes and a guide hole of the third set of M guide holes are a single guide hole through the center structure-cell.

12. A method for self-aligning components of an atomic sensor including a center structure-cell, a first cover, and a second cover, the method comprising:

at least one of: (a) form fitting each atomic sensor component of a first set of atomic sensor components into a unique recess in the first cover and (b) affixing each atomic sensor component of a second set of atomic sensor components to a pedestal surface of a unique pedestal projecting from the first cover;

at least one of: (a) form fitting each atomic sensor component of a third set of atomic sensor components into a unique recess in the second cover and/or (b) affixing each atomic sensor component of a fourth set of atomic sensor components to a pedestal surface of a unique pedestal projecting from the second cover;

aligning each guide hole of a first set of guide holes in the first cover is aligned with a unique guide hole of a second set of guide holes in the center structure-cell, and inserting an alignment pin into each aligned pair of a guide hole of the first set of guide holes and a guide hole of the second set of guide holes; and aligning each guide hole of a third set of guide holes in the second cover with a unique guide hole of a fourth set of guide holes in the center structure-cell, and inserting an alignment pin into each aligned pair of a guide hole of the third set of guide holes and a guide hole of the fourth set of guide holes;

wherein each atomic sensor component of the first set of atomic sensor components and the second set of atomic sensor components is self-aligned with respect to at least one of a portion of the center structure-cell and an atomic sensor component of one of the third set of atomic sensor components or the fourth set of atomic sensor components;

wherein each atomic sensor component of the third set of atomic sensor components and the fourth set of atomic sensor components is self-aligned with respect to at least one of a portion of the center structure-cell and an atomic sensor component of the first set of atomic sensor components or the second set of atomic sensor components.

13. The method of claim 12, further comprising at least one of: further attaching the first cover to the center structure-cell and further attaching the second cover to the center structure-cell.

14. The method of claim 13, wherein further attaching comprises screwing each of at least one screw into a pair of align screw holes in a cover and in the center structure-cell.

15. The method of claim 12, further comprising removing at least one inserted pin.

16. An atomic sensor, comprising:

a center structure-cell (SC) comprising a center structure, a cell which is in the center structure and which contains a vapor of atoms, and a first set of guide holes, a first SC surface and a second SC surface opposite the first SC surface;

a first cover comprising (a) a second set of guide holes and (b) at least one of: a first set of recesses in a first surface of the first cover and a first set of pedestals projecting from the first surface of the first cover, wherein each recess of the first set of recesses is form fitted with either a first wire coil, a first mirror, or a first photosensor, and wherein either the first wire coil, the first mirror, or the first photosensor is mounted on each pedestal of the first set of pedestals; and a second cover comprising (a) a third set of guide holes and (b) at least one of: a second set of recesses in a second surface of the second cover and a second set of pedestals projecting from the second surface of the second cover, wherein each recess of the second set of recesses is form fitted with either a photonic grating, a second wire coil, a second mirror, or a second photosensor, and wherein either the photonic grating, the second wire coil, the second mirror, or the second photosensor is mounted on each pedestal of the second set of pedestals;

wherein the first cover is mechanically attached to the center structure-cell;

wherein the first surface is adjacent to the first SC surface;

wherein the second cover is mechanically attached to the center structure-cell;

wherein the second surface is adjacent to the second SC surface;

wherein each guide hole of the first set of guide holes configured to be aligned, with a guide hole of at least one of the second set of guide holes and the third set of guide holes, forming a set of aligned guide holes;

wherein a component on a pedestal or in a recess of the first cover or the second cover is self-aligned with at least one of a portion of the center structure-cell and another component on another pedestal or in another recess of respectively the second cover or the first cover.

17. The atomic sensor of claim 16, wherein each set of aligned guide holes is configured to receive an alignment pin configured to align and attach the cell, the first cover, and the second cover.

18. The atomic sensor of claim 17, wherein the center structure-cell further comprises a first set of threaded screw holes;

wherein the first cover comprises a second set of threaded screw holes;

wherein the second cover comprises a third set of threaded screw holes;

wherein each screw hole of the first set of threaded screw holes is configured to be aligned, with a threaded screw hole of at least one of each of the second set of threaded screw holes and the third set of threaded screw holes, forming a set of aligned screw holes; and wherein each set of aligned threaded screw holes is configured to receive a screw which is tightened after alignment pins are received.

19. The atomic sensor of claim 16, wherein each set of aligned guide holes is configured to contemporaneously receive a pin configured to align the cell, the first cover, and the second cover.

20. The atomic sensor of claim 16, wherein the first cover comprises a first pin set comprising at least two pins projecting from the first surface and each pin of the first pin set is configured to be inserted into a unique hole in the first SC surface; and wherein the second cover comprises a second pin set comprising at least two pins projecting from the second surface and each pin of the second pin set is configured to be inserted into a unique hole in the second SC surface.

* * * * *